(12) United States Patent
Komatsu

(10) Patent No.: US 11,306,252 B2
(45) Date of Patent: Apr. 19, 2022

(54) LIQUID CRYSTAL POLYESTER RESIN COMPOSITION AND INJECTION MOLDED BODY

(71) Applicant: SUMITOMO CHEMICAL COMPANY, LIMITED, Tokyo (JP)

(72) Inventor: Shintaro Komatsu, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 94 days.

(21) Appl. No.: 16/755,873

(22) PCT Filed: Oct. 26, 2018

(86) PCT No.: PCT/JP2018/039894
§ 371 (c)(1),
(2) Date: Apr. 13, 2020

(87) PCT Pub. No.: WO2019/087965
PCT Pub. Date: May 9, 2019

(65) Prior Publication Data
US 2020/0299582 A1    Sep. 24, 2020

(30) Foreign Application Priority Data

Oct. 31, 2017 (JP) ............................. JP2017-210132

(51) Int. Cl.
| | | |
|---|---|---|
| *C09K 19/38* | (2006.01) | |
| *B29C 45/00* | (2006.01) | |
| *C09K 19/52* | (2006.01) | |
| *C08K 3/04* | (2006.01) | |
| *B29K 67/00* | (2006.01) | |
| *C08K 7/06* | (2006.01) | |

(52) U.S. Cl.
CPC ...... *C09K 19/3809* (2013.01); *B29C 45/0001* (2013.01); *C09K 19/52* (2013.01); *B29K 2067/04* (2013.01); *C08K 3/045* (2017.05); *C08K 7/06* (2013.01); *C09K 2019/521* (2013.01)

(58) Field of Classification Search
CPC .... C09K 19/38; C09K 19/3809; C09K 19/52; C09K 2019/521; B29C 45/0001; B29K 2067/04; C08K 3/045; C08K 7/06
See application file for complete search history.

(56) References Cited

U.S. PATENT DOCUMENTS

| | | | |
|---|---|---|---|
| 6,683,783 B1 | 1/2004 | Smalley et al. | |
| 8,043,527 B2 * | 10/2011 | Iwase ................. | C09K 19/3809 252/299.67 |
| 8,066,907 B2 * | 11/2011 | Kohinata ........... | C09K 19/3809 252/299.6 |
| 2006/0113391 A1 | 6/2006 | Fukatsu | |
| 2010/0230637 A1 | 9/2010 | Iwase et al. | |
| 2011/0073807 A1 | 3/2011 | Kohinata et al. | |
| 2011/0232826 A1 | 9/2011 | Hara et al. | |
| 2012/0202397 A1 | 8/2012 | Wolf et al. | |

FOREIGN PATENT DOCUMENTS

| | | |
|---|---|---|
| CN | 1817970 A | 8/2006 |
| CN | 106633733 A | 5/2017 |
| EP | 2 457 871 A1 | 5/2012 |
| EP | 3 029 107 A1 | 6/2016 |
| JP | 06-172619 A | 6/1994 |
| JP | 2002-515847 A | 5/2002 |
| JP | 2005-105152 A | 4/2005 |
| JP | 2005-146100 A | 6/2005 |
| JP | 2005-154582 A | 6/2005 |
| JP | 2005-220216 A | 8/2005 |
| JP | 2005-290288 A | 10/2005 |
| JP | 2006-016466 A | 1/2006 |
| JP | 2007-169374 A | 7/2007 |
| JP | 2008-100901 A | 5/2008 |
| JP | 2008-230911 A | 10/2008 |
| JP | 2008-230912 A | 10/2008 |
| JP | 2009-535530 A | 10/2009 |
| JP | 2011-001230 A | 1/2011 |
| JP | 2011-093973 A | 5/2011 |
| JP | 2011-094116 A | 5/2011 |
| JP | 2011-112896 A | 6/2011 |
| JP | 2011-113790 A | 6/2011 |
| JP | 2011-113846 A | 6/2011 |
| JP | 2011-117404 A | 6/2011 |
| JP | 2011-125181 A | 6/2011 |
| JP | 2011-218800 A | 11/2011 |
| JP | 2012-072370 A | 4/2012 |
| JP | 2012-241089 A | 12/2012 |

(Continued)

OTHER PUBLICATIONS

Jiang Z et al., "Improved bonding between PAN-based carbon fibers and fullerene-modified epoxy matrix", Composites Part A: Applied Science and Manufacturing, Elsevier, vol. 39, No. 11, Nov. 1, 2008 (Nov. 1, 2008), pp. 1762-1767.
Extended European Search Report issued in corresponding European Patent Application No. 18871988.4, dated Mar. 15, 2021.
International Search Report issued in corresponding International Patent Application No. PCT/JP2018/039894, dated Jan. 15, 2019, with English translation.
European Office Action issued in corresponding European Patent Application No. 18871988.4, dated Nov. 8, 2021.
Chinese Search Report issued in corresponding Chinese Patent Application No. 201880067330.9, dated Nov. 8, 2021, with English translation.

*Primary Examiner* — Geraldina Visconti
(74) *Attorney, Agent, or Firm* — McDermott Will & Emery LLP

(57) ABSTRACT

A liquid crystal polyester resin composition including a liquid crystal polyester resin, 15 parts by mass or more and 100 parts by mass or less of a carbon fiber with respect to 100 parts by mass of the liquid crystal polyester resin, and 0.001 parts by mass or more and 0.02 parts by mass or less of a fullerene with respect to 100 parts by mass of the carbon fiber.

6 Claims, 3 Drawing Sheets

(56) References Cited

FOREIGN PATENT DOCUMENTS

| | | |
|---|---|---|
| JP | 2013-509503 A | 3/2013 |
| JP | 2016-028140 A | 2/2016 |
| WO | 2007/130979 A2 | 11/2007 |
| WO | 2011/053458 A1 | 5/2011 |

* cited by examiner

LIQUID CRYSTAL POLYESTER RESIN COMPOSITION AND INJECTION MOLDED BODY

CROSS REFERENCE TO RELATED APPLICATIONS

This application is the U.S. National Phase under 35 U.S.C. § 371 of International Application No. PCT/JP2018/039894, filed on Oct. 26, 2018, which claims the benefit of Japanese Application No. 2017-210132, filed on Oct. 31, 2017, the entire contents of each are hereby incorporated by reference.

TECHNICAL FIELD

The present invention relates to a liquid crystal polyester resin composition and an injection molded body.

Priority is claimed on Japanese Patent Application No. 2017-210132, filed Oct. 31, 2017, the content of which is incorporated herein by reference.

BACKGROUND ART

Liquid crystal polyester resins are extremely excellent in melt fluidity and have a heat distortion resistance of 300° C. or more depending on the structure. Liquid crystal polyester resins are used for molded bodies in applications such as electronic components, OA, AV components, heat resistant tableware and the like, by taking advantage of such characteristics.

As a molding method for obtaining a molded body, an injection molding method is generally employed. In the injection molding method, a liquid crystal polyester resin composition obtained by adding other components to a liquid crystal polyester resin if necessary is usually used. For example, Patent Document 1 proposes a resin composition obtained by adding 1 to 200 parts by weight of a carbon fiber to 100 parts by weight of a liquid crystal polyester resin in order to obtain a material having excellent mechanical properties, heat resistance, thin-wall moldability, and dimensional accuracy.

CITATION LIST

Patent Documents

Patent Document 1: JP H6-172619A

SUMMARY OF THE INVENTION

Problems to be Solved by the Invention

However, the liquid crystal polyester resin composition containing carbon fibers as described in Patent Document 1 is required to further improve the mechanical strength when formed into a molded body.

The present invention has been made in view of such circumstances, with an object of providing a liquid crystal polyester resin composition having excellent mechanical strength when formed into a molded body, and an injection molded body.

Means to Solve the Problems

In order to solve the above problems, one aspect of the present invention provides a liquid crystal polyester resin composition including a liquid crystal polyester resin, 15 parts by mass or more and 100 parts by mass or less of a carbon fiber with respect to 100 parts by mass of the liquid crystal polyester resin, and 0.001 parts by mass or more and 0.02 parts by mass or less of a fullerene with respect to 100 parts by mass of the carbon fiber.

In one aspect of the present invention, it may be configured so that the fullerene is a mixture of $C_{60}$, $C_{70}$, and a higher fullerene with a skeleton portion of more than 70 carbon atoms.

In one aspect of the present invention, it may be configured so that a content of $C_{60}$ with respect to the total mass of the fullerene is 50% by mass or more and 90% by mass or less.

In one aspect of the present invention, it may be configured so that the fullerene includes an unsubstituted fullerene.

In one aspect of the present invention, it may be configured so that the fullerene is adsorbed onto the aforementioned carbon fiber.

One aspect of the present invention provides an injection molded body using the above liquid crystal polyester resin composition as a forming material.

That is, the present invention includes the following aspects.

[1] A liquid crystal polyester resin composition including:
 a liquid crystal polyester resin;
 15 parts by mass or more and 100 parts by mass or less of a carbon fiber with respect to 100 parts by mass of the aforementioned liquid crystal polyester resin; and
 0.001 parts by mass or more and 0.02 parts by mass or less of a fullerene with respect to 100 parts by mass of the aforementioned carbon fiber.

[2] The liquid crystal polyester resin composition according to [1], wherein the aforementioned fullerene is a mixture of $C_{60}$, $C_{70}$, and a higher fullerene with a skeleton portion of more than 70 carbon atoms.

[3] The liquid crystal polyester resin composition according to [2], wherein a content of the aforementioned $C_{60}$ with respect to the total mass of the aforementioned fullerene is 50% by mass or more and 90% by mass or less.

[4] The liquid crystal polyester resin composition according to any one of [1] to [3], wherein the aforementioned fullerene includes an unsubstituted fullerene.

[5] The liquid crystal polyester resin composition according to any one of [1] to [4], wherein the aforementioned fullerene is adsorbed onto the aforementioned carbon fiber.

[6] An injection molded body formed from the liquid crystal polyester resin composition according to any one of [1] to [5].

Effects of the Invention

According to one aspect of the present invention, a liquid crystal polyester resin composition having excellent mechanical strength when formed into a molded body, and an injection molded body are provided.

EMBODIMENTS FOR CARRYING OUT THE INVENTION

<Liquid Crystal Polyester Resin Composition>

Figure 1:
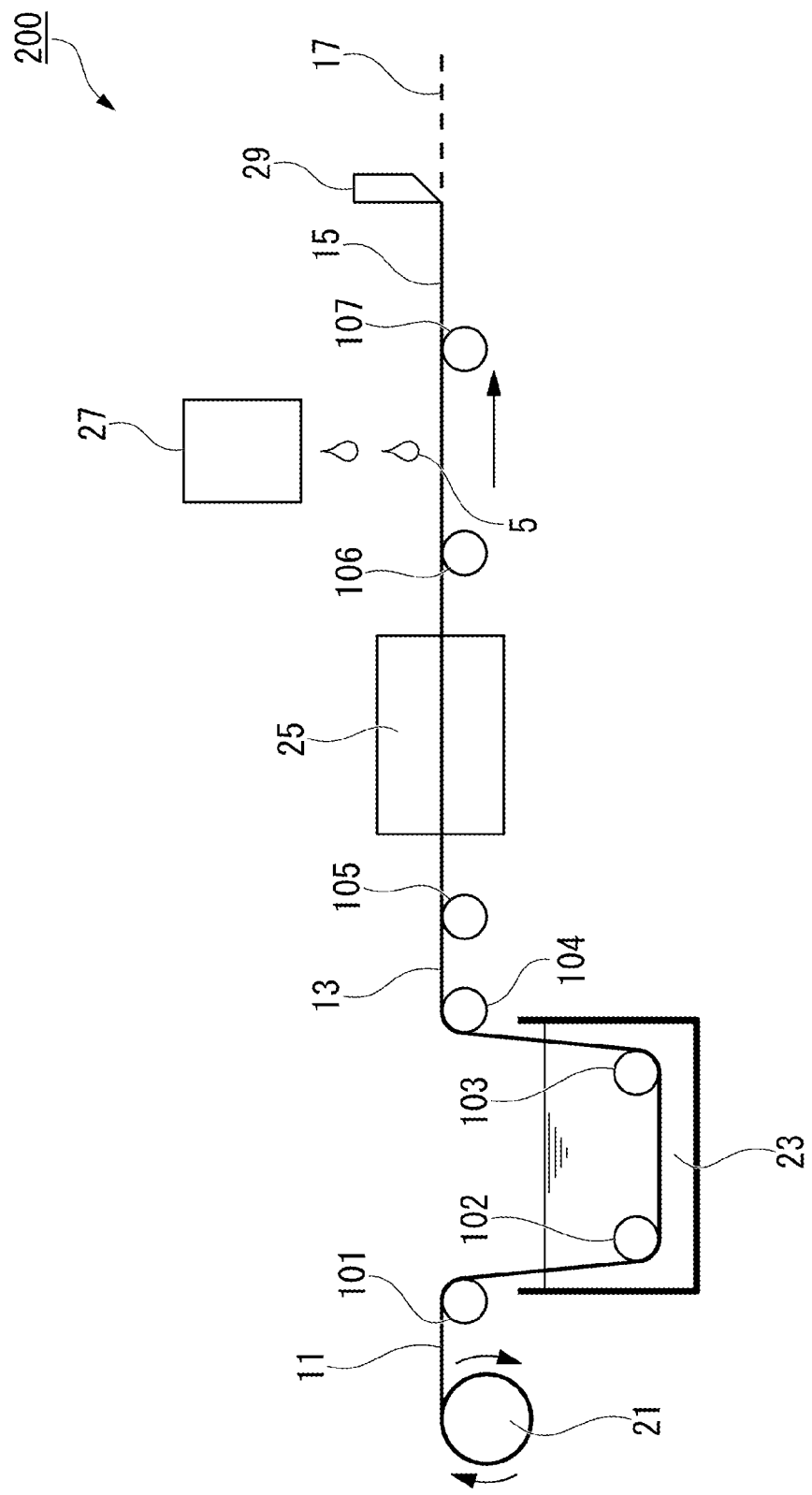
FIG. 1 is a schematic cross-sectional view of an apparatus suitably used in a method for producing a liquid crystal polyester resin composition of the present embodiment.

Hereinafter, a liquid crystal polyester resin composition according to an embodiment of the present invention will be described with reference to the drawings. It should be noted that in the drawings, in order to make the drawings easier to see, dimensions, ratios and the like of each constituent are appropriately changed.

The liquid crystal polyester resin composition of the present embodiment is a mixture containing a liquid crystal polyester resin, a carbon fiber and a fullerene.

[Liquid Crystal Polyester Resin]

The liquid crystal polyester resin contained in the liquid crystal polyester resin composition of the present embodiment is a liquid crystal polyester resin exhibiting liquid crystallinity in a molten state, and preferably melts at a temperature of 200° C. or higher and 450° C. or lower. It should be noted that the liquid crystal polyester resin may be a liquid crystal polyester amide, a liquid crystal polyester ether, a liquid crystal polyester carbonate, or a liquid crystal polyester imide. The liquid crystal polyester resin is preferably a wholly aromatic liquid crystal polyester resin that can be produced from only an aromatic compound as a raw material monomer.

Typical examples of the liquid crystal polyester resin include those obtained by polymerization (polycondensation) of an aromatic hydroxycarboxylic acid, an aromatic dicarboxylic acid, and at least one compound selected from the group consisting of an aromatic diol, an aromatic hydroxylamine and an aromatic diamine; those obtained by polymerization of a plurality of types of aromatic hydroxycarboxylic acids; those obtained by polymerization of an aromatic dicarboxylic acid and at least one compound selected from the group consisting of an aromatic diol, an aromatic hydroxylamine and an aromatic diamine; and those obtained by polymerization of a polyester such as polyethylene terephthalate and an aromatic hydroxycarboxylic acid. Here, the aromatic hydroxycarboxylic acid, the aromatic dicarboxylic acid, the aromatic diol, the aromatic hydroxylamine and the aromatic diamine may be each independently replaced partially or entirely with a polymerizable derivative thereof.

Examples of the polymerizable derivative of a compound having a carboxyl group, such as an aromatic hydroxycarboxylic acid and an aromatic dicarboxylic acid, include those obtained by converting a carboxyl group into an alkoxycarbonyl group or an aryloxycarbonyl group (that is, an ester), those obtained by converting a carboxyl group into a haloformyl group (that is, an acid halide), and those obtained by converting a carboxyl group into an acyloxycarbonyl group (that is, an acid anhydride). Examples of the polymerizable derivative of a compound having a hydroxyl group, such as an aromatic hydroxycarboxylic acid, an aromatic diol and an aromatic hydroxylamine, include those obtained by acylating and converting a hydroxyl group into an acyloxyl group (that is, an acylated product of hydroxyl group). Examples of the polymerizable derivative of a compound having an amino group, such as an aromatic hydroxylamine and an aromatic diamine, include those obtained by acylating and converting an amino group into an acylamino group (that is, an acylated product of amino group).

The liquid crystal polyester resin preferably has a repeating unit represented by the following formula (1) (hereinafter may be referred to as "repeating unit (1)" in some cases), and more preferably has the repeating unit (1), a repeating unit represented by the following formula (2) (hereinafter may be referred to as "repeating unit (2)" in some cases) and a repeating unit represented by the following formula (3) (hereinafter may be referred to as "repeating unit (3)" in some cases).

—O—Ar¹—CO— (1)

—CO—Ar²—CO— (2)

—X—Ar³—Y— (3)

(Ar¹ represents a phenylene group, a naphthylene group or a biphenylylene group; Ar² and Ar³ each independently represent a phenylene group, a naphthylene group, a biphenylylene group or a group represented by the following formula (4); X and Y each independently represent an oxygen atom or an imino group (—NH—); and hydrogen atoms contained in the aforementioned group represented by Ar¹, Ar² or Ar³ may be each independently substituted with a halogen atom, an alkyl group or an aryl group.)

—Ar⁴—Z—Ar⁵— (4)

(Ar⁴ and Ar⁵ each independently represent a phenylene group or a naphthylene group; and Z represents an oxygen atom, a sulfur atom, a carbonyl group, a sulfonyl group or an alkylidene group.)

Examples of the halogen atom include a fluorine atom, a chlorine atom, a bromine atom and an iodine atom. The alkyl group is preferably an alkyl group having 1 to 10 carbon atoms, and examples thereof include a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group and an n-decyl group. As examples of the aryl group, aryl groups having 6 to 20 carbon atoms are preferable, and examples thereof include a phenyl group, an o-tolyl group, a m-tolyl group, a p-tolyl group, a 1-naphthyl group and a 2-naphthyl group. When the aforementioned hydrogen atom is substituted with these groups, the number of substitutions is each independently 2 or less, and preferably 1 for each of the groups represented by Ar¹, Ar² or Ar³.

The alkylidene group is preferably an alkylidene group having 1 to 10 carbon atoms, and examples thereof include a methylene group, an ethylidene group, an isopropylidene group, an n-butylidene group and a 2-ethylhexylidene group.

The repeating unit (1) is a repeating unit derived from a predetermined aromatic hydroxycarboxylic acid. As the repeating unit (1), those in which Ar¹ is a p-phenylene group (for example, a repeating unit derived from p-hydroxybenzoic acid) and those in which Ar¹ is a 2,6-naphthylene group (for example, a repeating unit derived from 6-hydroxy-2-naphthoic acid) are preferable.

The repeating unit (2) is a repeating unit derived from a predetermined aromatic dicarboxylic acid. As the repeating unit (2), those in which Ar² is a p-phenylene group (for example, a repeating unit derived from terephthalic acid), those in which Ar² is a m-phenylene group (for example, a repeating unit derived from isophthalic acid), those in which Ar² is a 2,6-naphthylene group (for example, a repeating unit derived from 2,6-naphthalenedicarboxylic acid), and those in which Ar² is a diphenyl ether-4,4'-diyl group (for example, a repeating unit derived from diphenyl ether-4,4'-dicarboxylic acid) are preferable.

The repeating unit (3) is a repeating unit derived from a predetermined aromatic diol, aromatic hydroxylamine or aromatic diamine. As the repeating unit (3), those in which Ar³ is a p-phenylene group (for example, a repeating unit derived from hydroquinone, p-aminophenol or p-phenylenediamine), and those in which Ar³ is a 4,4'-biphenylylene group (for example, a repeating unit derived from 4,4'-dihydroxybiphenyl, 4-amino-4'-hydroxybiphenyl or 4,4'-diaminobiphenyl) are preferable.

In the present specification, the expression "derived" means that a chemical structure is changed due to polymerization.

The content of the repeating unit (1) is usually 30 mol % or more, preferably from 30 to 80 mol %, more preferably from 40 to 70 mol %, and still more preferably from 45 to 65 mol %, with respect to the total amount of all the repeating units (that is, a value obtained by dividing the mass of each repeating unit constituting the liquid crystal polyester resin by the formula weight of each repeating unit, determining the equivalents (mol) of the amounts of substances of each repeating unit and summing them up). The content of the repeating unit (2) is usually 35 mol % or less, preferably from 10 to 35 mol %, more preferably from 15 to 30 mol %, and still more preferably from 17.5 to 27.5 mol % with respect to the total amount of all the repeating units. The content of the repeating unit (3) is usually 35 mol % or less, preferably from 10 to 35 mol %, more preferably from 15 to 30 mol %, and still more preferably from 17.5 to 27.5 mol % with respect to the total amount of all the repeating units. The higher the content of the repeating unit (1), the easier the melt fluidity, heat resistance and strength/rigidity are improved, but if it is too high, the melt temperature and melt viscosity tend to be high, and the temperature required for molding tends to be high.

The ratio of the content of the repeating unit (2) to the content of the repeating unit (3) represented by the formula: [content of the repeating unit (2)]/[content of the repeating unit (3)] (mol/mol) is usually from 0.9/1 to 1/0.9, preferably from 0.95/1 to 1/0.95, and more preferably from 0.98/1 to 1/0.98.

It should be noted that the liquid crystal polyester resin may have two or more types of repeating units (1) to (3), independently of each other. Further, the liquid crystal polyester resin may have a repeating unit other than the repeating units (1) to (3), but the content thereof is usually 10 mol % or less, and preferably 5 mol % or less, with respect to the total amount of all the repeating units.

Since the melt viscosity is likely to be lowered, the liquid crystal polyester resin preferably includes those in which X and Y each represent an oxygen atom, that is, includes a repeating unit derived from a predetermined aromatic diol, as the repeating unit (3), and more preferably includes only those in which X and Y each represent an oxygen atom as the repeating unit (3).

The liquid crystal polyester resin is preferably produced by melt polymerization of a raw material monomer corresponding to the repeating unit constituting the liquid crystalline polyester resin and solid phase polymerization of the obtained polymer (hereinafter, sometimes referred to as "prepolymer"). As a result, a high-molecular-weight liquid crystal polyester resin having high heat resistance, strength and rigidity can be produced with favorable operability. The melt polymerization may be carried out in the presence of a catalyst, and examples of the catalyst include metal compounds such as magnesium acetate, stannous acetate, tetrabutyl titanate, lead acetate, sodium acetate, potassium acetate and antimony trioxide, and nitrogen-containing heterocyclic compounds such as 4-(dimethylamino)pyridine and 1-methylimidazole, and nitrogen-containing heterocyclic compounds are preferably used.

The flow starting temperature of the liquid crystal polyester resin is 270° C. or higher, preferably from 270 to 400° C., and more preferably from 280 to 380° C. The higher the flow starting temperature, the easier it is to improve the heat resistance and the strength/rigidity. However, if it is too high, the melt temperature and the melt viscosity tend to be high, and the temperature required for molding tends to be high.

It should be noted that the term "flow starting temperature" is also referred to as flow temperature or fluidity temperature and serves as an indicator of the molecular weight of a liquid crystal polyester resin, which is a temperature where a viscosity of 4,800 Pa·s (48,000 poise) is exhibited when a liquid crystal polyester resin is melted and extruded from a nozzle having an inner diameter of 1 mm and a length of 10 mm, while raising the temperature at a rate of 4° C./min using a capillary rheometer under a load of 9.8 MPa (100 kg/cm²) (see "Liquid Crystal Polymer—Synthesis, Molding, and Application —" edited by Naoyuki Koide, p. 95, CMC Publishing Co., Ltd., published on Jun. 5, 1987).

[Carbon Fiber]

The carbon fiber contained in the liquid crystal polyester resin composition of the present embodiment is a general carbon fiber obtained by firing a precursor. More specifically, first, the precursor is subjected to a flame-resistant treatment in an oxidizing atmosphere, and then the obtained flame-resistant fiber is fired at about 800 to 2,000° C. in an inert gas atmosphere. Furthermore, if necessary, the resultant is fired in an inert gas at a higher temperature. Carbon fibers having a sizing agent applied to the surface thereof have been known.

The type of carbon fiber contained in the liquid crystal polyester resin composition of the present embodiment is not particularly limited, and examples thereof include polyacrylonitrile-based (hereinafter, sometimes referred to as "PAN-based"), petroleum/coal pitch-based (hereinafter, sometimes referred to as "pitch-based"), rayon-based and lignin-based carbon fibers.

Examples of the PAN-based carbon fibers include "Torayca (registered trademark)" manufactured by Toray Industries, Inc., "Pyrofil (registered trademark)" manufactured by Mitsubishi Rayon Co., Ltd., and "Tenax (registered trademark)" manufactured by Toho Tenax Co., Ltd. Examples of the pitch-based carbon fibers include "Dialead (registered trademark)" manufactured by Mitsubishi Chemical Functional Products, Inc., "Donacarbo (registered trademark)" manufactured by Osaka Gas Chemicals Co., Ltd., and "Kreca (registered trademark)" manufactured by Kureha Corporation.

The carbon fiber contained in the liquid crystal polyester resin composition of the present embodiment is not particularly limited, but a carbon fiber bundle in which a plurality of single fibers are bundled or a chopped carbon fiber is preferable, and a carbon fiber bundle is more preferable from the viewpoint of productivity.

The number average fiber diameter of the carbon fibers contained in the liquid crystal polyester resin composition of the present embodiment is not particularly limited, but is preferably 1 μm or more and 10 μm or less, and more preferably 5 μm or more and 8 μm or less. As the number average fiber diameter of carbon fibers, a number average of values obtained by observing carbon fibers with a scanning electron microscope (1,000 times magnification) and measuring fiber diameters of 50 carbon fibers was adopted. As the number average fiber length of carbon fibers, a number average of values obtained by observing carbon fibers with a microscope (20 times magnification) and measuring fiber lengths of 500 carbon fibers was adopted.

When the number average fiber diameter of the above carbon fibers is 1 μm or more, the carbon fibers are easily dispersed in the liquid crystal polyester resin. In addition, the carbon fibers are easily handled during the production of the liquid crystal polyester resin composition. Further, when the number average fiber diameter of the carbon fibers is 10 μm or less, the liquid crystal polyester resin is efficiently reinforced by the carbon fibers. Therefore, excellent mechanical strength can be imparted to the molded body formed from the liquid crystal polyester resin composition of the present embodiment.

The number of fibers bundled in the carbon fiber bundle contained in the liquid crystal polyester resin composition of the present embodiment is not particularly limited, but is preferably 3,000 or more, and more preferably 12,000 or more. When the number of fibers bundled in the carbon fiber bundle is 3,000 or more, the content of carbon fibers in the liquid crystal polyester resin composition becomes sufficient in view of excellent mechanical strength when formed into a molded body. Further, the number of fibers bundled in the carbon fiber bundle is preferably 60,000 or less, and more preferably 18,000 or less. When the number of fibers bundled in the carbon fiber bundle is 60,000 or less, the carbon fibers are easily dispersed in the liquid crystal polyester resin. In addition, the carbon fibers are easily handled during the production of the liquid crystal polyester resin composition. That is, in one aspect, the number of fibers bundled in the carbon fiber bundle contained in the liquid crystal polyester resin composition of the present embodiment is preferably 3,000 or more and 60,000 or less, and more preferably 12,000 or more and 18,000 or less.

[Fullerene]

The fullerene contained in the liquid crystal polyester resin composition of the present embodiment is not limited in the number of carbon atoms as long as it has a fullerene structure, but is preferably, for example, a fullerene having 60 to 84 carbon atoms. The fullerene contained in the liquid crystal polyester resin composition of the present embodiment is preferably a mixture of $C_{60}$, $C_{70}$, and a higher fullerene with a skeleton portion of more than 70 carbon atoms. In the present specification, the term "$C_{60}$" means that the skeleton portion has 60 carbon atoms, and it does not matter whether or not there is a substituent. Further, the same applies to other fullerenes such as $C_{70}$. A mixture of $C_{60}$, $C_{70}$, and higher fullerenes is called a mixed fullerene. Further, in the liquid crystal polyester resin composition of the present embodiment, the content of $C_{60}$ with respect to the total mass of the fullerene is preferably 50% by mass or more and 90% by mass or less.

The type of the substituent of the fullerene contained in the liquid crystal polyester resin composition of the present embodiment is not particularly limited, but the fullerene preferably contains an unsubstituted fullerene.

Such a fullerene is preferably dispersed in the liquid crystal polyester resin of the present embodiment. Further, it is more preferable that the fullerene is adsorbed onto the above carbon fiber in the liquid crystal polyester resin composition of the present embodiment, and is dispersed in the liquid crystal polyester resin integrally with the carbon fiber.

A commercially available product may be obtained as the fullerene contained in the liquid crystal polyester resin composition of the present embodiment. As the fullerene used in the present embodiment, for example, "nanom (registered trademark) MIX ST" manufactured by Frontier Carbon Corporation or the like can be mentioned.

Alternatively, a fullerene produced by supplying a hydrocarbon raw material and an oxygen-containing gas to a reaction furnace and incompletely combusting or thermally decomposing them in the reaction furnace may be used.

As the hydrocarbon raw material, for example, aromatic hydrocarbons having 6 to 15 carbon atoms such as benzene, toluene, xylene, naphthalene, methylnaphthalene, anthracene, and phenanthrene; coal-based hydrocarbons such as creosote oil and carboxylic acid oil; acetylene-based unsaturated hydrocarbons, ethylene-based hydrocarbons, aliphatic saturated hydrocarbons such as pentane and hexane, and the like can be used. These can also be used alone or in a mixture at an arbitrary ratio.

Aromatic hydrocarbons are particularly preferable as the hydrocarbon raw material, and above all, it is preferable to use purified aromatic hydrocarbons. Although the purity of a carbon-containing fuel gas is preferably higher, the carbon-containing fuel gas may be diluted with an inert gas such as argon gas in order to control the combustion temperature or the concentration of the carbon-containing fuel gas during the combustion reaction.

As the oxygen-containing gas, an oxygen gas having a concentration of 99% or more, one obtained by diluting an oxygen gas having a concentration of 99% or more with an inert gas such as nitrogen or argon gas, air, or the like is used.

The mixing ratio of $C_{60}$, $C_{70}$ and higher fullerenes can be controlled by changing the equivalence ratio between the hydrocarbon raw material and the oxygen-containing gas described above.

The expression "equivalence ratio between the hydrocarbon raw material and the oxygen-containing gas" is defined by the following formula using the mixing ratio between the hydrocarbon raw material and the oxygen-containing gas in the reaction furnace, that is, the molar ratio between the hydrocarbon raw material and the oxygen in the oxygen-containing gas:

Equivalence ratio=$A_1/A_2$

Here, $A_1$ indicates the actual molar ratio between the hydrocarbon raw material and the oxygen (the number of moles of the hydrocarbon raw material)/(the number of moles of the oxygen). $A_2$ indicates the molar ratio between the hydrocarbon raw material and the oxygen (the number of moles of the hydrocarbon raw material)/(the number of moles of the oxygen) at the time of complete combustion (stoichiometry).

More specifically, by increasing the equivalence ratio between the hydrocarbon raw material and the oxygen-containing gas, the proportion of $C_{60}$ in the fullerene can be reduced, and the proportion of higher fullerenes in the fullerene can be increased. It should be noted that the proportion of $C_{70}$ in the fullerene decreases as the equivalence ratio increases, and then increases.

Further, the mixing ratio of $C_{60}$, $C_{70}$ and higher fullerenes can also be controlled by changing the pressure in the reaction furnace.

More specifically, by bringing the pressure inside the reaction furnace closer to that on the vacuum side, the proportions of $C_{60}$ and $C_{70}$ in the fullerene can be increased, and the proportion of higher fullerenes in the fullerene can be reduced.

[Other Components]

The liquid crystal polyester resin composition of the present embodiment may further include at least one other component such as a filler other than the carbon fiber and fullerene of the present embodiment, an additive, and a resin other than the liquid crystal polyester resin. In addition, in the liquid crystal polyester resin composition of the present embodiment, it is preferable that the other component is 0.05 parts by mass or more and 100 parts by mass or less with respect to 100 parts by mass of the liquid crystal polyester resin.

The filler may be a fibrous filler, a plate-like filler, or, other than the fibrous and plate-like fillers, a spherical or other particulate filler. Further, the filler may be an inorganic filler or an organic filler.

Examples of the fibrous inorganic filler include glass fibers; ceramic fibers such as silica fibers, alumina fibers and silica alumina fibers; and metal fibers such as stainless steel fibers. In addition, whiskers such as potassium titanate whiskers, barium titanate whiskers, wollastonite whiskers, aluminum borate whiskers, silicon nitride whiskers and silicon carbide whiskers can also be mentioned.

Examples of the fibrous organic filler include polyester fibers and aramid fibers.

Examples of the plate-like inorganic filler include talc, mica, graphite, wollastonite, glass flakes, barium sulfate and calcium carbonate. The mica may be muscovite, phlogopite, fluorophlogopite or tetrasilicic mica.

Examples of the particulate inorganic filler include silica, alumina, titanium oxide, glass beads, glass balloons, boron nitride, silicon carbide, and calcium carbonate.

Examples of the additives include antioxidants, thermal stabilizers, ultraviolet absorbers, antistatic agents, surfactants, flame retardants and colorants.

Examples of the resin other than the liquid crystal polyester resin include thermoplastic resins other than the liquid crystal polyester resin such as polypropylenes, polyamides, polyesters other than the liquid crystal polyester resin, polysulfones, polyphenylene sulfides, polyether ketones, polycarbonates, polyphenylene ethers and polyether imides; and thermosetting resins such as phenol resins, epoxy resins, polyimide resins and cyanate resins.

[Method for Producing Liquid Crystal Polyester Resin Composition]

The liquid crystal polyester resin composition of the present embodiment can be obtained by mixing a liquid crystal polyester resin, a carbon fiber, a fullerene, and optionally other components.

A method for producing the liquid crystal polyester resin composition of the present embodiment preferably includes the following steps (i) to (iv):

(i) a step of impregnating the carbon fiber with a solution containing the fullerene to obtain a composite fiber;

(ii) a step of drying the composite fiber impregnated with the above solution;

(iii) a step of obtaining a composite of the dried composite fiber and a molten liquid crystal polyester resin; and (iv) a step of cutting the composite.

Figure 2:
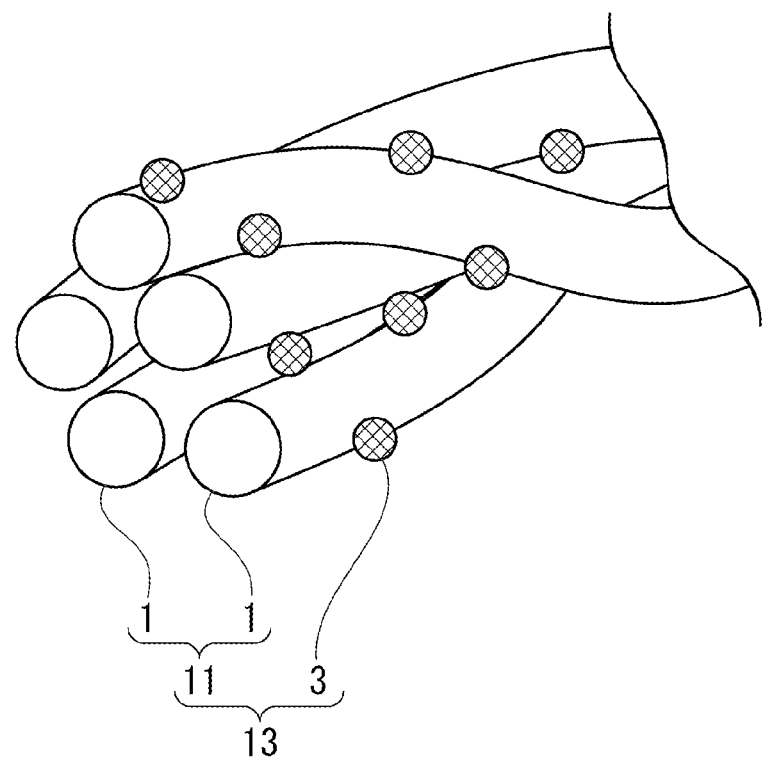
FIG. 2 is a schematic perspective view showing a preferred embodiment of a composite fiber obtained in step (i).

FIG. 1 is a schematic cross-sectional view of an apparatus suitably used in the method for producing the liquid crystal polyester resin composition of the present embodiment. FIG. 2 is a schematic perspective view showing a preferred embodiment of the composite fiber obtained in step (i).

Hereinafter, as an example of a preferred embodiment of the liquid crystal polyester resin composition produced in the present embodiment, a pellet composed of the liquid crystal polyester resin composition will be described. Further, a case where a carbon fiber roving 11 in which a plurality of single fibers 1 (see FIG. 2) are bundled is used as the carbon fiber will be described.

As shown in FIG. 1, a production apparatus 200 includes an impregnation tank 23, a drying device 25, an extruder 27, and a cutting device 29. Further, the production apparatus 200 includes a feed roller 21 and conveyor rollers 101 to 107.

FIG. 1 shows a state in which the carbon fiber roving 11 is supplied from one side in a state of being wound around the feed roller 21. In the present embodiment, a pellet composed of the liquid crystal polyester resin composition is produced while conveying the carbon fiber roving 11 in the longitudinal direction by the conveyor rollers 101 to 107.

The fineness of the carbon fiber roving 11 used for producing the liquid crystal polyester resin composition of the present embodiment is not particularly limited, but is preferably 200 g/1,000 m or more, and more preferably 800 g/1,000 m or more. When the fineness of the carbon fiber roving 11 is 200 g/1,000 m or more, the carbon fiber roving 11 is easily handled in the method for producing a liquid crystal polyester resin composition. Further, the fineness of the carbon fiber is preferably 3,750 g/1,000 m or less, and more preferably 3,200 g/1,000 m or less. When the fineness of the carbon fibers is 3,750 g/1,000 m or less, the carbon fibers are easily dispersed in the liquid crystal polyester resin. In addition, the carbon fibers are easily handled during the production of the liquid crystal polyester resin composition.

In one aspect, the fineness of the carbon fibers is preferably 200 g/1,000 m or more and 3,750 g/1,000 m or less, and more preferably 800 g/1,000 m or more and 3,200 g/1,000 m or less.

When producing the liquid crystal polyester resin composition of the present embodiment, the amount of sizing agent for the carbon fibers may be reduced before use.

The amount of sizing agent adhered to the carbon fibers can be reduced by a known method. As a method of reducing the amount of sizing agent, for example, a method of dissolving the sizing agent by continuously immersing the carbon fiber roving 11 in a tank filled with an organic solvent such as acetone can be mentioned. In addition, there is a method of reducing the amount of sizing agent by immersing the carbon fiber roving 11 in a water tank. As another method, a method of reducing the amount of sizing agent by exposing the carbon fiber roving 11 to superheated steam, thereby causing water vapor to permeate into the interface between the carbon fiber and the sizing agent of the carbon fiber roving 11 can be mentioned. Furthermore, there is a method of heating the carbon fiber roving 11 to a temperature equal to or higher than the decomposition temperature of the sizing agent but lower than the decomposition temperature of the carbon fiber.

The impregnation tank 23 stores a solution containing the fullerene. The solution containing the fullerene is obtained by dispersing or dissolving the above-mentioned fullerene in a solvent. In the impregnation tank 23, the carbon fiber roving 11 is impregnated with the solution containing the fullerene to obtain a composite fiber roving 13 impregnated with the solution containing the fullerene. Here, the composite fiber roving 13 corresponds to the "composite fiber" in the above-mentioned step (ii) and step (iii).

The solvent for dispersing or dissolving the fullerene is not particularly limited, but is an organic solvent which is a liquid at ordinary temperatures (from 15 to 25° C.) and has a boiling point of 50 to 300° C. Examples of the organic solvent having a boiling point of 50 to 300° C. include methanol, propylene glycol 1-monomethyl ether 2-acetate, 1-methoxy-2-propanol, cyclohexanone, tetrahydrofuran, aromatic hydrocarbons such as benzene, toluene, xylene, methicillin, 1-methoxybenzene, o-dichlorobenzene, 1,2,4-trimethylbenzene, 1,2,3,5-tetramethylbenzene, tetralin, and 1-methylnaphthalene.

One of the above-mentioned solvents may be used alone, or two or more types thereof may be used in combination.

The solution containing the fullerene which is used in the above step (i) preferably contains the above-mentioned fullerene in an amount of 0.0001% by mass or more and 1% by mass or less with respect to the total amount of the solution.

When the concentration of the fullerene in the above solution is 0.0001% by mass or more, the fullerene can be mixed with the carbon fiber roving 11 in an amount necessary for obtaining sufficient mechanical strength when formed into a molded body. Further, when the concentration of the fullerene in the above solution is 1% by mass or less, the amount of the fullerene which is not mixed with the carbon fiber roving 11 can be reduced, and the cost can be reduced.

In the present embodiment, the amount of the fullerene mixed with the carbon fiber roving 11 can be increased by increasing the concentration of the fullerene in the above solution. Further, the amount of the fullerene mixed with the carbon fiber roving 11 can also be increased by increasing the residence time of the carbon fiber roving 11 in the impregnation tank 23.

The drying device 25 dries the composite fiber roving 13 to reduce the liquid content of the composite fiber roving 13. The drying device 25 is a device capable of heating or air blowing. In the drying device 25, the composite fiber roving 13 is dried by heating, air blowing, or the like. Further, in the drying device 25, the composite fiber roving 13 may be dried by a combination of heating and air blowing.

The drying temperature in the drying device 25 is preferably determined by the boiling point of the solvent for dispersing or dissolving the fullerene. When the boiling point of the solvent is low, the drying temperature may be room temperature (for example, 23° C.). Further, when the boiling point of the solvent is high, the drying temperature may be a temperature higher than room temperature.

For example, when methylene chloride (boiling point: 39.6° C.) is used as the solvent, it is preferable to dry the composite fiber roving 13 by blowing air at room temperature.

The drying time is not particularly limited, but is preferably 24 hours or less, and more preferably 2 hours or less. Further, when using a carbon fiber roving, the drying time is more preferably 10 minutes or less, and particularly preferably 1 minute or less.

The extruder 27 melts the liquid crystal polyester resin 5 described above. It is preferable to set the cylinder temperature of the extruder 27 to a temperature higher than the flow starting temperature of the liquid crystal polyester resin 5 to be used by 10 to 80° C. The liquid crystal polyester resin 5 in a molten state caused by the extruder 27 and other components added as necessary are coated on the composite fiber roving 13 to obtain a composite 15 of the liquid crystal polyester resin 5 and the composite fiber roving 13.

The cutting device 29 cuts the composite 15 into a desired length to produce the pellet 17. The cutting device 29 includes, for example, a rotary blade or the like.

A method for producing the liquid crystal polyester resin composition of the present embodiment using the above-described production apparatus will be described.

First, in the step (i), the carbon fiber roving 11 unwound from the feed roller 21 is immersed in the impregnation tank 23 to obtain the composite fiber roving 13. The composite fiber roving 13 is a mixture of the carbon fiber roving 11 and a fullerene 3. As shown in FIG. 2, in the composite fiber roving 13, it is preferable that the fullerene 3 is adsorbed onto the surfaces of the plurality of single fibers 1 of the carbon fiber roving 11.

Next, in the step (ii), the obtained composite fiber roving 13 is dried using the drying device 25.

Next, in the step (iii), the liquid crystal polyester resin 5 is melted using the extruder 27. The liquid crystal polyester resin 5 in the molten state and other components optionally added are coated on the composite fiber roving 13 and drawn into a strand to obtain the composite 15.

Next, in the step (iv), the strand-like composite 15 is cut into a desired length to produce the pellet 17. Here, the "desired length of the pellet 17" refers to the length of the pellet 17 set in accordance with the required performance of the molded body obtained by forming the pellet 17. The pellet 17 composed of the liquid crystal polyester resin composition of the present embodiment is produced in this manner.

The inventors of the present invention have found that the liquid crystal polyester resin composition of the present embodiment is excellent in mechanical strength when formed into a molded body, as compared with a resin composition in which only a carbon fiber is blended with a liquid crystal polyester resin, and completed the present invention. It should be noted that the mechanical strength in the present embodiment is evaluated by measuring the flexural strength and the Izod impact strength.

The flexural strength in the present embodiment is measured as follows. First, using the liquid crystal polyester resin composition of the present embodiment, a test piece having a length of 127 mm, a width of 12.7 mm, and a thickness of 6.4 mm is produced by injection molding under the molding conditions described later in the section entitled <Flexural strength and flexural modulus> in Examples. The flexural strength of the test piece is measured based on ASTM D790.

The Izod impact strength in the present embodiment is measured as follows. First, using the liquid crystal polyester resin composition of the present embodiment, a test piece having a length of 127 mm, a width of 12.7 mm, and a thickness of 6.4 mm is produced by injection molding under the molding conditions described later in the section entitled <Flexural strength and flexural modulus> in Examples. The Izod impact strength of the test piece is measured based on ASTM D256.

Figure 3:
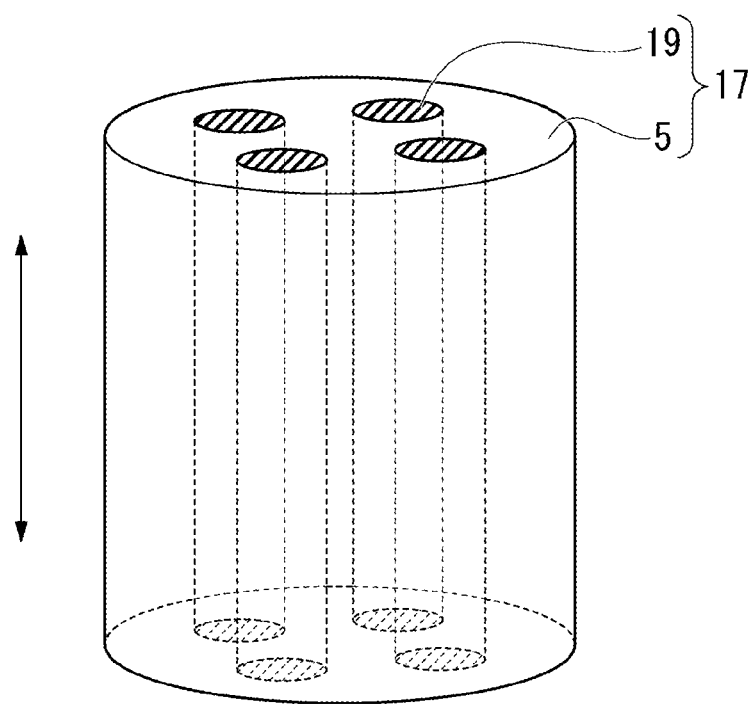
FIG. 3 is a schematic perspective view showing an embodiment of a pellet 17 produced in the present embodiment.
Figure 4:
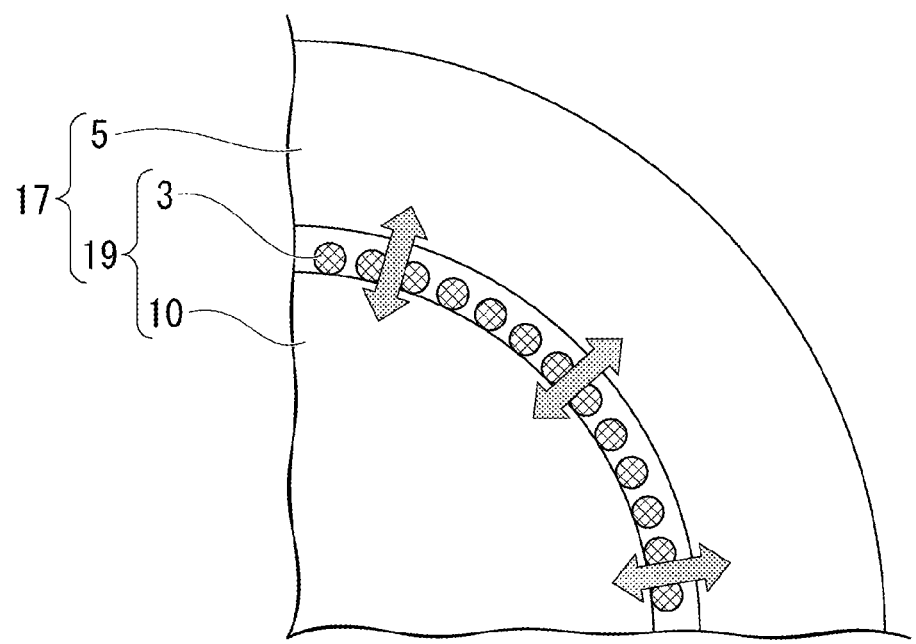
FIG. 4 is an enlarged view showing a periphery of a composite fiber 19 in FIG. 3.

FIG. 3 is a schematic perspective view showing an embodiment of the pellet 17 produced in the present embodiment. FIG. 4 is an enlarged view showing a periphery of the composite fiber 19 obtained by cutting the composite fiber roving 13 in FIG. 3. The arrow in FIG. 3 indicates the axial direction of the pellet 17.

As shown in FIG. 3, in the pellet 17 of the present embodiment, the composite fibers 19 are arranged substantially parallel to the axial direction of the pellet 17, and the length of the composite fiber 19 is substantially the same as the length of the pellet 17. Further, in the pellet 17 shown in FIG. 3, the cross section of the composite fiber 19 is exposed.

Here, the expression "substantially the same length" means, for example, that the composite fiber 19 is not cut inside the pellet 17 or that the composite fiber 19 that is significantly shorter than the entire length of the pellet 17 is not substantially contained.

The "entire length of the pellet 17" is the length of the composite fiber 19 in the pellet 17 in the orientation direction. The entire length of the pellet 17 is preferably 1 mm or more, more preferably 4 mm or more, and still more preferably 8 mm or more. Further, the entire length of the pellet 17 is preferably 20 mm or less, more preferably 18 mm or less, and still more preferably 15 mm or less. The upper limit value and the lower limit value of the entire length of the pellet 17 can be arbitrarily combined.

In one aspect, the entire length of the pellet 17 is preferably 1 mm or more and 20 mm or less, more preferably 4 mm or more and 18 mm or less, and still more preferably 8 mm or more and 15 mm or less. Further, in another aspect, the entire length of the pellet 17 is, for example, 12 mm.

The composite fiber 19 contained in the pellet 17 is melt-kneaded during injection molding and becomes shorter. If the entire length of the pellet 17 is 1 mm or more, the length of the composite fiber 19 after melt-kneading becomes sufficiently long. As a result, the mechanical strength of the obtained injection molded body tends to increase. Further, if the entire length of the pellet 17 is 20 mm or less, the length of the composite fiber 19 after melt-kneading does not become too long. As a result, the fluidity of the liquid crystal polyester resin composition tends to be satisfactory, and the productivity can be sufficiently maintained.

The cross-sectional shape of the pellet 17 is not limited to the one shown in the drawing as long as the liquid crystal polyester resin 5 is in contact with the composite fiber 19. As shown in FIG. 3, a core-sheath structure configuration in which the composite fibers 19 are arranged to constitute a core structure and the periphery thereof is covered with the liquid crystal polyester resin 5 is preferable.

In step (i), a mixture of the fullerene 3 and the carbon fiber roving 11 can be obtained by impregnating the carbon fiber roving 11 with a solution in which the fullerene 3 is dispersed or dissolved. After the step (i) is completed, it is preferable that the fullerene 3 is adsorbed onto the plurality of single fibers 1 of the carbon fiber roving 11 as shown in FIG. 2.

In addition, in the step (iii), it is preferable that the composite fiber roving 13 and the liquid crystal polyester resin 5 are in contact with each other at the interface by coating the composite fiber roving 13 with the liquid crystal polyester resin 5. Further, as shown in FIG. 4, it is preferable that the fullerene 3 is present in the vicinity of the interface between the carbon fiber bundle 10 from which the carbon fiber roving 11 has been cut and the liquid crystal polyester resin 5.

The liquid crystal polyester resin composition of the present embodiment is excellent in mechanical strength when formed into a molded body, as compared with a resin composition in which only a carbon fiber is blended with a liquid crystal polyester resin. It is considered that the fullerene 3 interacts with the liquid crystal polyester resin and the carbon fiber bundle at the interface, so that the mechanical strength when formed into a molded body is further improved.

The fullerene 3 in the pellet 17 can be confirmed by observing the pellet 17 with a transmission electron microscope. It should be noted that a part of the fullerene 3 may be dispersed in the liquid crystal polyester resin constituting the liquid crystal polyester resin composition.

In the present embodiment, the step (iv) can also be omitted. The pellet composed of the liquid crystal polyester resin composition of the present embodiment may be continuous in the axial direction thereof.

In the present embodiment, an example in which the composite fiber roving 13 is dried using the drying device 25 in the step (ii) has been shown, but the present invention is not limited thereto. For example, the composite fiber roving 13 may be naturally dried without using the drying device 25.

Further, in the present embodiment, the method for producing the liquid crystal polyester resin composition using the apparatus shown in FIG. 1 has been described, but the present invention is not limited thereto. For example, when a liquid crystal polyester resin composition is produced on a small scale, it may be carried out by the method as shown below.

First, a carbon fiber bundle is charged into a solution containing a fullerene and the resulting mixture is stirred, whereby the carbon fiber bundle and the fullerene are mixed to obtain a composite fiber. Next, a liquid crystal polyester resin and the above composite fiber are supplied to a twin screw extruder (for example, "PCM-30" manufactured by Ikegai Ironworks Corp.) and melt-kneaded, and then a pellet composed of a liquid crystal polyester resin composition is produced.

Figure 5:
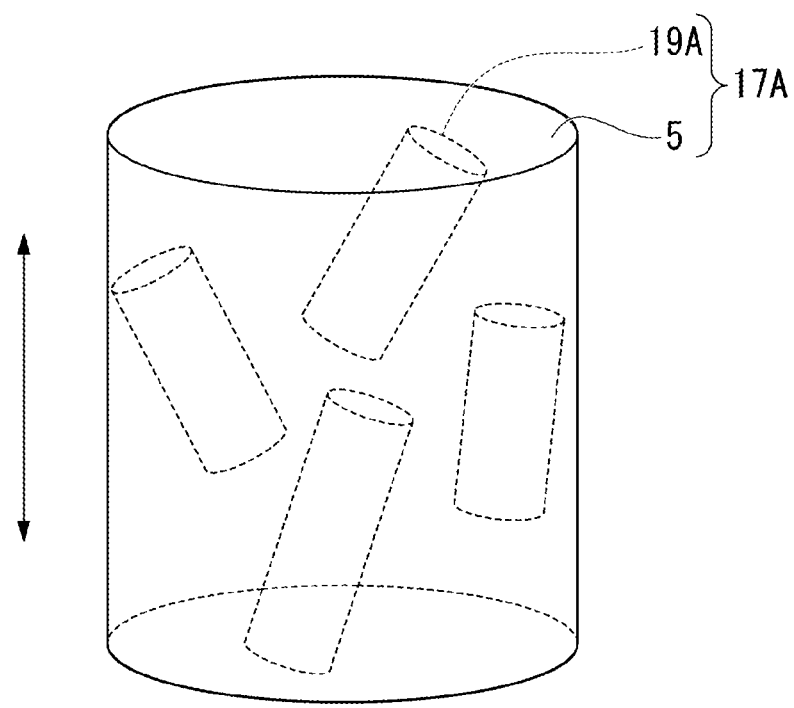
FIG. 5 is a schematic perspective view showing an embodiment of a pellet produced by another method.

The pellet obtained in this manner is different from the pellet shown in FIGS. 3 and 4 in the form of the carbon fiber bundle. FIG. 5 is a schematic perspective view showing a form of a pellet 17A produced by another method. As shown in FIG. 5, composite fibers 19A are randomly arranged, and the length of the composite fibers 19A is shorter than the length of the carbon fiber bundle to be used.

Further, although the cross section of the composite fiber 19 is exposed in the pellet 17 shown in FIG. 3, in the pellet 17A shown in FIG. 5, the cross section of the composite fiber 19A is less exposed. This is because the carbon fiber bundle constituting the composite fiber 19A breaks by performing melt-kneading in the process of producing the liquid crystal polyester resin composition.

It should be noted that in the small-scale production of the liquid crystal polyester resin composition described above, when a fullerene is added to a solution containing a carbon fiber bundle, the fullerene is not sufficiently dispersed. As a result, it is difficult to obtain a desired composite fiber.

Further, it also becomes difficult to obtain a desired liquid crystal polyester resin composition by the above method in which the liquid crystal polyester resin, the carbon fiber bundle, and the fullerene are supplied to the extruder at a time and melt-kneaded. In the liquid crystal polyester resin composition produced in this manner, it is presumed that the fullerene is dispersed throughout the composition. As a result, it is considered that the fullerene hardly interacts with the liquid crystal polyester resin and the carbon fiber bundle, and the effect of improving the mechanical strength by the fullerene is not obtained.

[Liquid Crystal Polyester Resin Composition]

The liquid crystal polyester resin composition of the present embodiment includes a liquid crystal polyester resin, 15 parts by mass or more and 100 parts by mass or less of a carbon fiber with respect to 100 parts by mass of the liquid crystal polyester resin, and 0.001 parts by mass or more and 0.02 parts by mass or less of a fullerene with respect to 100 parts by mass of the carbon fiber.

The content of the liquid crystal polyester resin is preferably 50% by mass or more and 80% by mass or less with respect to the total mass of the liquid crystal polyester resin composition.

The content of the carbon fiber is preferably 20 parts by mass or more and 100 parts by mass or less, and more preferably 25 parts by mass or more and 100 parts by mass or less with respect to 100 parts by mass of the liquid crystal polyester resin.

When the amount of the carbon fiber in the liquid crystal polyester resin composition is 15 parts by mass or more with respect to 100 parts by mass of the liquid crystal polyester resin, sufficient mechanical strength can be obtained when formed into a molded body. Further, when the amount of the carbon fiber in the liquid crystal polyester resin composition is 100 parts by mass or less with respect to 100 parts by mass of the liquid crystal polyester resin, the viscosity of the liquid crystal polyester resin composition can be sufficiently reduced at the time of melt-kneading.

When the amount of the fullerene in the liquid crystal polyester resin composition is 0.001 parts by mass or more with respect to 100 parts by mass of the carbon fiber, sufficient mechanical strength can be obtained when formed into a molded body. Further, when the amount of the fullerene in the liquid crystal polyester resin composition is 0.02 parts by mass or less with respect to 100 parts by mass of the carbon fiber, mechanical strength can be efficiently obtained when formed into a molded body, and the cost can be reduced.

On the other hand, when the amount exceeds 0.02 parts by mass with respect to 100 parts by mass of the carbon fiber, the effect of improving the mechanical strength by the fullerene levels off. Further, in order to increase the mechanical strength, it is preferable that 0.001 parts by mass or more and 0.02 parts by mass or less of a fullerene with respect to 100 parts by mass of the carbon fiber is adsorbed onto the carbon fiber.

As described above, according to the present embodiment, a liquid crystal polyester resin composition having excellent mechanical strength when formed into a molded body is provided.

<Injection Molding>

An injection molded body of the present embodiment is obtained by molding the liquid crystal polyester resin composition described above as a forming material by an injection molding method. More specifically, the liquid crystal polyester resin composition is melted using a known injection molding machine, and the molten liquid crystal polyester resin composition is molded by injecting it into a mold. Examples of known injection molding machines include a hydraulic horizontal molding machine (PS40E5ASE model) manufactured by Nissei Plastic Industrial Co., Ltd., and the like.

The cylinder temperature of the injection molding machine is preferably set to a temperature higher than the flow starting temperature of the liquid crystal polyester resin to be used by 10 to 50° C.

The temperature of the mold is preferably set within a range of room temperature (for example, 23° C.) to 180° C. from the viewpoints of the cooling rate of the liquid crystal polyester resin composition and the productivity.

As described above, according to the present embodiment, an injection molded body having excellent mechanical strength is provided.

The injection molded body of the present invention is generally applicable to all applications to which a liquid crystal polyester resin can be applied. For example, in the field of automobiles, applications including structural members such as A-pillars, B-pillars and chassis, interior materials, and outer panels can be mentioned. Examples of other applications include sensors, LED lamps, connectors, sockets, resistors, relay cases, switches, coil bobbins, capacitors, variable capacitor cases, optical pickups, oscillators, various terminal boards, transformers, plugs, printed circuit boards, tuners, speakers, microphones, headphones, small motors, magnetic head bases, power modules, FDD carriages, FDD chassis, motor brush holders, parabolic antennas, other semiconductor parts, other liquid crystal display parts, other computer related parts, other microwave parts, other acoustic and audio equipment parts, other lighting parts, other air conditioner parts, other office computer related parts, other telephone/facsimile related parts, other copying machine related parts, and the like.

Although the preferred embodiments according to the present invention have been described above with reference to the accompanying drawings, it goes without saying that the present invention is not limited to such embodiments. Various shapes, combinations, and the like for the respective constituent members shown in the above-described examples are merely examples, and various changes and modifications can be made based on design requirements or the like without departing from the spirit and scope of the present invention.

EXAMPLES

The present invention will be described below with reference to examples, but the present invention is not limited to these examples. It should be noted that the flow starting temperature of the liquid crystal polyester resin was measured as follows.

<Measurement of Flow Starting Temperature of Liquid Crystal Polyester Resin>

Using a Flowtester ("CFT-500 model" manufactured by Shimadzu Corporation), a cylinder equipped with a die including a nozzle having an inner diameter of 1 mm and a length of 10 mm was filled with about 2 g of a liquid crystal polyester, the liquid crystal polyester was melted and extruded from the nozzle while raising the temperature at a rate of 4° C./min under a load of 9.8 MPa (100 kg/cm$^2$), and a temperature at which a viscosity of 4,800 Pa·s (48,000 poise) was exhibited was measured.

In the following examples, the following commercially available products were used.

Liquid crystal polyester resin: RB 100 (manufactured by Sumitomo Chemical Co., Ltd., flow starting temperature: 333° C.).

Carbon fiber bundle: PAN-based chopped carbon fiber (manufactured by Mitsubishi Rayon Co., Ltd., number average fiber length: 6 mm; number average fiber diameter: 6 μm).

Fullerene: nanom (registered trademark) MIX ST (manufactured by Frontier Carbon Corporation), in which a ratio of $C_{60}/C_{70}$/higher fullerene was 60/20/20 in mass ratio.

<Production of Liquid Crystal Polyester Resin Composition>

Example 1

Using the liquid crystal polyester resin, the carbon fiber bundle and the fullerene at the ratios shown in Table 1, a liquid crystal polyester resin composition in which these were mixed was obtained. First, the carbon fiber bundle was charged into a methylene chloride solution prepared so that the concentration of the fullerene became 10 ppm, and immersed for 24 hours (impregnation step). After stirring, the resulting mixture was filtered using a filter (pore size: 1 μm), and the residue was naturally dried for 24 hours (drying step). In this way, a composite fiber in which the fullerene was mixed with the carbon fiber bundle was obtained. It should be noted that the numerical values in Table 1 refer to parts by mass.

Next, a liquid crystal polyester resin and the above composite fiber were supplied to a twin screw extruder ("PCM-30" manufactured by Ikegai Ironworks Corp., cylinder temperature: 280° C.) and melt-kneaded, and then a pellet composed of a liquid crystal polyester resin composition was produced.

In the pellet of Example 1, the content of the fullerene with respect to 100 parts by mass of the carbon fiber was measured as follows. First, a calibration curve showing the relationship between the peak area of the chromatograph measured by high performance liquid chromatography under the following conditions and the concentration of the fullerene was produced in advance. Next, the methylene chloride solution before and after the impregnation of the carbon fiber bundle was measured by high performance liquid chromatography under the same conditions, and the concentration of the fullerene was determined.

[Conditions]

Apparatus: high performance liquid chromatograph 1200 series (manufactured by Agilent Technologies, Inc.)

Column: YMC column YMC-Pack ODS-AM

Developing solvent (volume ratio): toluene/methanol=51/49

Flow rate: 1.2 mL/min

Detection method: ultraviolet absorption (308 nm)

Using the obtained concentration of the fullerene, the content of the fullerene with respect to 100 parts by mass of the carbon fiber was calculated by the following formula.

Fullerene content=$\{(C_1-C_2) \times (M_1/M_2)\}/10$

In the formula, $C_1$ represents the concentration [mass ppm] of the fullerene in the methylene chloride solution before impregnation; $C_2$ represents the concentration [mass ppm] of the fullerene in the methylene chloride solution after impregnation; $M_1$ represents the mass [g] of the methylene chloride solution; and $M_2$ represents the mass [mg] of the carbon fiber.

The content of the fullerene in the pellet of Example 1 calculated as described above was 0.0013 parts by mass with respect to 100 parts by mass of the carbon fiber.

Comparative Example 1

A pellet composed of a liquid crystal polyester resin composition was produced in the same manner as in Example 1 except that the fullerene was not used.

Comparative Example 2

At the ratios shown in Table 1, the liquid crystal polyester resin, the carbon fiber bundle and the fullerene were supplied to a twin screw extruder ("PCM-30" manufactured by Ikegai Ironworks Corp., cylinder temperature: 280° C.) and melt-kneaded, and then a pellet composed of a liquid crystal polyester resin composition was produced.

TABLE 1

|  | Ex. 1 | Comp. Ex. 1 | Comp. Ex. 2 |
| --- | --- | --- | --- |
| Liquid crystal polyester resin | 100 | 100 | 100 |
| Carbon fiber bundle | 54 | 54 | 54 |
| Fullerene | 1 | — | 1 |

The obtained pellet was dried with hot air at 130° C. for 4 hours, and was then evaluated by the following method.

<Flexural Strength and Flexural Modulus>

A test piece of 12.7 mm×6.4 mm×6.4 mmt was injection molded using an injection molding machine ("PNX40-5A" manufactured by Nissei Plastic Industrial Co., Ltd.). The molding conditions were set to a cylinder temperature of 350° C., a mold temperature of 130° C., and an injection speed of 75 mm/sec.

The flexural modulus and flexural strength of the obtained test piece were measured based on ASTM D790.

<Izod Impact Strength>

The Izod impact strength of the test piece (without notches) obtained in the section entitled <Flexural strength and flexural modulus> described above was measured in accordance with ASTM D256.

<Deflection Temperature Under Load>

The deflection temperature under load of the test piece obtained in the section entitled <Flexural strength and flexural modulus> described above was measured at a rate of temperature increase of 2° C./min under a load of 1.82 MPa in accordance with ASTM D648.

The evaluation results are shown in Table 2.

TABLE 2

|  | Ex. 1 | Comp. Ex. 1 | Comp. Ex. 2 |
| --- | --- | --- | --- |
| Flexural strength [MPa] | 223 | 189 | 175 |
| Flexural modulus [GPa] | 19.5 | 17.4 | 15.1 |
| Izod impact strength [J/m] | 172 | 120 | 140 |
| Deflection temperature under load [° C.] | 282 | 272 | 272 |

As shown in Table 2, in Example 1 to which the present invention was applied, the flexural strength, flexural modulus and Izod impact strength of the molded body (test piece) were higher than those in Comparative Example 1. In other words, in Example 1, the mechanical strength of the molded body was superior to that in Comparative Example 1.

In addition, in Example 1, the deflection temperature under load of the molded body (test piece) was higher than that in Comparative Example 1. In other words, in Example 1, the heat resistance of the molded body was also superior to that in Comparative Example 1.

Further, in Example 1, the raw materials were used at the same ratios as in Comparative Example 2. However, in Example 1, the mechanical strength of the molded body was superior to that in Comparative Example 2. This is presumed that in the liquid crystal polyester resin composition of Example 1, the fullerene was present in the vicinity of the interface between the carbon fiber bundle and the liquid crystal polyester resin. As a result, it is considered that the fullerene interacted with the liquid crystal polyester resin and the carbon fiber bundle, respectively, whereby excellent mechanical strength was exhibited.

On the other hand, in Comparative Example 2, the liquid crystal polyester resin, the carbon fiber bundle and the fullerene were simply mixed to produce a liquid crystal polyester resin composition. In the liquid crystal polyester resin composition produced in this manner, it is presumed that the fullerene is dispersed throughout the composition. As a result, it is considered that the fullerene hardly interacted with the liquid crystal polyester resin and the carbon fiber bundle, and the effect of improving the mechanical strength by the fullerene was not obtained.

From the above results, it was shown that the present invention is useful.

INDUSTRIAL APPLICABILITY

The present invention can provide a liquid crystal polyester resin composition having excellent mechanical strength when formed into a molded body, and an injection molded body, and it is therefore extremely useful industrially.

REFERENCE SIGNS LIST

1: Single fiber; 3: Fullerene; 5: Liquid crystal polyester resin; 10: Carbon fiber bundle; 11: Carbon fiber roving; 13: Composite fiber roving; 15: Composite; 17, 17A: Pellet; 19, 19A: Composite fiber

The invention claimed is:

1. A liquid crystal polyester resin composition comprising:
    a liquid crystal polyester resin;
    15 parts by mass or more and 100 parts by mass or less of a carbon fiber with respect to 100 parts by mass of the liquid crystal polyester resin; and
    0.001 parts by mass or more and 0.02 parts by mass or less of a fullerene with respect to 100 parts by mass of the carbon fiber,
    wherein the fullerene is adsorbed onto the carbon fiber.

2. The liquid crystal polyester resin composition according to claim 1,
    wherein the fullerene has a fullerene structure containing a fullerene skeleton, and the fullerene is a mixture of a fullerene having 60 carbon atoms in the skeleton portion, a fullerene having 70 carbon atoms in the skeleton portion, and a higher fullerene having more than 70 carbon atoms in the skeleton portion.

3. The liquid crystal polyester resin composition according to claim 2,
    wherein a content of the fullerene having 60 carbon atoms with respect to the total mass of the fullerene is 50% by mass or more and 90% by mass or less.

4. The liquid crystal polyester resin composition according to claim 1, wherein the fullerene comprises an unsubstituted fullerene.

5. An injection molded body formed from the liquid crystal polyester resin composition according to claim 1.

6. The liquid crystal polyester resin composition according to claim 1, wherein the carbon fiber is a carbon fiber bundle in which a plurality of single fibers are bundled, and a number of fibers bundled in the carbon fiber bundle is 3,000 or more and 60,000 or less.

* * * * *